United States Patent
Wang et al.

(10) Patent No.: US 11,212,670 B2
(45) Date of Patent: Dec. 28, 2021

(54) DETECTING METHOD OF UE CAPABILITY, REPORTING METHOD OF UE CAPABILITY, MOBILE TERMINAL AND SERVER

(71) Applicant: VIVO MOBILE COMMUNICATION CO., LTD., Guangdong (CN)

(72) Inventors: Baigang Wang, Chang'an Dongguan (CN); Wenjin Li, Chang'an Dongguan (CN)

(73) Assignee: VIVO MOBILE COMMUNICATION CO., LTD., Chang'An Dongguan (CN)

( * ) Notice: Subject to any disclaimer, the term of this patent is extended or adjusted under 35 U.S.C. 154(b) by 0 days.

(21) Appl. No.: 16/981,251

(22) PCT Filed: Mar. 27, 2019

(86) PCT No.: PCT/CN2019/079849
§ 371 (c)(1),
(2) Date: Sep. 15, 2020

(87) PCT Pub. No.: WO2019/184945
PCT Pub. Date: Oct. 3, 2019

(65) Prior Publication Data
US 2021/0029534 A1 Jan. 28, 2021

(30) Foreign Application Priority Data
Mar. 28, 2018 (CN) .......................... 201810265077.X

(51) Int. Cl.
*H04W 8/24* (2009.01)
*H04W 8/00* (2009.01)
*H04W 68/02* (2009.01)

(52) U.S. Cl.
CPC ............. *H04W 8/24* (2013.01); *H04W 8/005* (2013.01); *H04W 68/02* (2013.01)

(58) Field of Classification Search
CPC ........ H04W 8/005; H04W 8/24; H04W 68/02
(Continued)

(56) References Cited

U.S. PATENT DOCUMENTS

2008/0009328 A1* 1/2008 Narasimha ........ H04W 52/0216
455/574
2008/0261628 A1 10/2008 Proctor et al.
(Continued)

FOREIGN PATENT DOCUMENTS

| CN | 101801072 A | 8/2010 |
|---|---|---|
| CN | 102448051 A | 5/2012 |

(Continued)

OTHER PUBLICATIONS

Chinese Search Report issued in corresponding application No. 201810265077.X, dated Nov. 20, 2018.
(Continued)

*Primary Examiner* — Joel Ajayi
(74) *Attorney, Agent, or Firm* — Maschoff Brennan

(57) ABSTRACT

A detecting method of a UE capability, a reporting method of a UE capability, a mobile terminal and a server are provided. The detecting method of the UE capability includes: receiving device information sent by a mobile terminal; sending an inquiry message for UE capability information to the mobile terminal based on the device information; and receiving the UE capability information which is sent by the mobile terminal according to the inquiry message.

16 Claims, 8 Drawing Sheets

(58) Field of Classification Search
USPC .......................................................... 455/458
See application file for complete search history.

(56) References Cited

U.S. PATENT DOCUMENTS

| | | |
|---|---|---|
| 2009/0080364 A1 | 3/2009 | Song et al. |
| 2012/0014316 A1* | 1/2012 | Rahman ................ H04W 40/02 |
| | | 370/328 |
| 2012/0297223 A1 | 11/2012 | Wu et al. |
| 2012/0300685 A1 | 11/2012 | Kim et al. |
| 2014/0056197 A1 | 2/2014 | Deng |
| 2014/0323165 A1 | 10/2014 | Diachina et al. |
| 2015/0327215 A1 | 11/2015 | Xu |
| 2016/0057738 A1* | 2/2016 | Lee ..................... H04W 72/042 |
| | | 370/329 |
| 2017/0164194 A1* | 6/2017 | Frederiksen ........ H04W 12/068 |
| 2021/0029534 A1 | 1/2021 | Wang et al. |

FOREIGN PATENT DOCUMENTS

| | | |
|---|---|---|
| CN | 102740459 A | 10/2012 |
| CN | 103596632 A | 2/2014 |
| CN | 106060910 A | 10/2016 |
| CN | 106162882 A | 11/2016 |
| CN | 108601068 A | 9/2018 |

OTHER PUBLICATIONS

Chinese Second Office Action issued in corresponding application No. 201810265077.X, dated Sep. 30, 2019.
International Search Report and Written Opinion issued in corresponding application No. PCT/CN2019/079849, dated Oct. 8, 2020.
EP Search Report in Application No. 19777272.6 dated Apr. 16, 2021.

* cited by examiner

DETECTING METHOD OF UE CAPABILITY, REPORTING METHOD OF UE CAPABILITY, MOBILE TERMINAL AND SERVER

CROSS REFERENCE OF RELATED APPLICATION

The present application is the U.S. national phase of PCT Application PCT/CN2019/079849 filed on Mar. 27, 2019, which claims a priority of Chinese patent application No. 201810265077.X filed on Mar. 28, 2018, which is incorporated herein by reference in its entirety.

TECHNICAL FIELD

The present disclosure relates to the field of communications technology, and in particular to a detecting method of a UE capability, a reporting method of a UE capability, a mobile terminal and a server.

BACKGROUND

Based on a measurement result of power consumption of the 4G mobile terminal in the network at present, it is found that when the mobile terminal is idle, it needs to monitor the paging message once every 1024 milliseconds (the paging period specified in the mobile communication standard). Each time the paging message is monitored, a working duration of a baseband chip is about 28 ms, and an average current is about 100 mA, while a standby current is only about 1 mA. When the mobile terminal receives a paging message, it determines whether the mobile terminal being paged is the mobile terminal itself; if not, the mobile terminal discards the paging message and continues to sleep. However, the users are actually paged very few times in a day, most of the paging are ineffective paging monitoring, which occupies many standby power consumption, especially for the 5G mobile terminals with higher power consumption, so the battery life of mobile terminal may be affected.

SUMMARY

A detecting method of a UE capability, a reporting method of a UE capability, a mobile terminal and a server are provided in some embodiments of the present disclosure, to solve the technical issue of the high power consumption caused by monitoring paging messages by the mobile terminal in the related art.

In order to solve the above technical issues, the present disclosure is described as follows.

In a first aspect, a detecting method of a UE capability is provided, applied to a core network, including:
receiving device information sent by a mobile terminal, where the device information is sent by the mobile terminal when the mobile terminal accesses a wireless access device connected to the Internet, and the device information at least includes identity information of the mobile terminal and location information of the wireless access device;
sending an inquiry message for UE capability information to the mobile terminal based on the device information, where the UE capability information indicates whether an adjustment of a paging period in a standby state is supported;
receiving the UE capability information which is sent by the mobile terminal according to the inquiry message.

In a second aspect, a reporting method of a UE capability is provided, applied to a mobile terminal, including:
sending device information to a core network when the mobile terminal accesses a wireless access device connected to the Internet, where the device information at least includes identity information of the mobile terminal and location information of the wireless access device;
receiving an inquiry message, which is sent by the core network, for UE capability information, where the inquiry message is sent by the core network after the device information is received by the core network, and the UE capability information indicates whether an adjustment of a paging period in a standby state is supported;
sending the UE capability information to the core network according to the inquiry message.

In a third aspect, a server is provided, including:
a first receiving module, configured to receive device information sent by a mobile terminal, where the device information is sent by the mobile terminal when the mobile terminal accesses a wireless access device connected to the Internet, and the device information at least includes identity information of the mobile terminal and location information of the wireless access device;
a first sending module, configured to send an inquiry message for UE capability information to the mobile terminal based on the device information received by the first receiving module, where the UE capability information indicates whether an adjustment of a paging period in a standby state is supported;
a second receiving module, configured to receive the UE capability information which is sent by the mobile terminal according to the inquiry message.

In a fourth aspect, a mobile terminal is provided, including:
a fourth sending module, configured to send device information to a core network when the mobile terminal accesses a wireless access device connected to the Internet, where the device information at least includes identity information of the mobile terminal and location information of the wireless access device;
a fourth receiving module, configured to receive an inquiry message, which is sent by the core network, for UE capability information, where the inquiry message is sent by the core network after the device information is received by the core network, and the UE capability information indicates whether an adjustment of a paging period in a standby state is supported;
a fifth sending module, configured to send the UE capability information to the core network according to the inquiry message.

In a fifth aspect, a server is provided, including: a processor, a memory, and a computer program stored in the memory and executable on the processor, where the processor executes the computer program to perform the detecting method of the UE capability hereinabove.

In a sixth aspect, a mobile terminal is provided, including: a processor, a memory, and a computer program stored in the memory and executable on the processor, where the processor executes the computer program to perform the reporting method of the UE capability hereinabove.

In a seventh aspect, a computer-readable storage medium is provided, including a computer program stored in the computer-readable storage medium, where the processor executes the computer program to perform the detecting method of the UE capability hereinabove, or the processor executes the computer program to perform the reporting method of the UE capability hereinabove.

According to some embodiments of the present disclosure, a UE capability of a mobile terminal is defined, that is, a capability of adjusting a paging period of monitoring a paging message in a standby state, so that when the mobile terminal supports the capability of adjusting the paging period in the standby state, the mobile terminal may extend the paging period of monitoring the paging message, so as to reduce the monitoring times during the same time duration, thereby reducing the power consumption, saving the power and extending the battery life of the mobile terminal. In the core network side, a UE capability detection mechanism of the mobile terminal is defined, so as to learn whether the mobile terminal has the ability to adjust the paging period in the standby state.

BRIEF DESCRIPTION OF THE DRAWINGS

In order to more clearly illustrate the technical solutions of some embodiments of the present disclosure, the following will briefly introduce the drawings used in the description of some embodiments of the present disclosure. Obviously, the drawings in the following description are only some embodiments of the present disclosure. For those of ordinary skill in the art, other drawings may be obtained based on these drawings without creative work.

DETAILED DESCRIPTION

Figure 1:
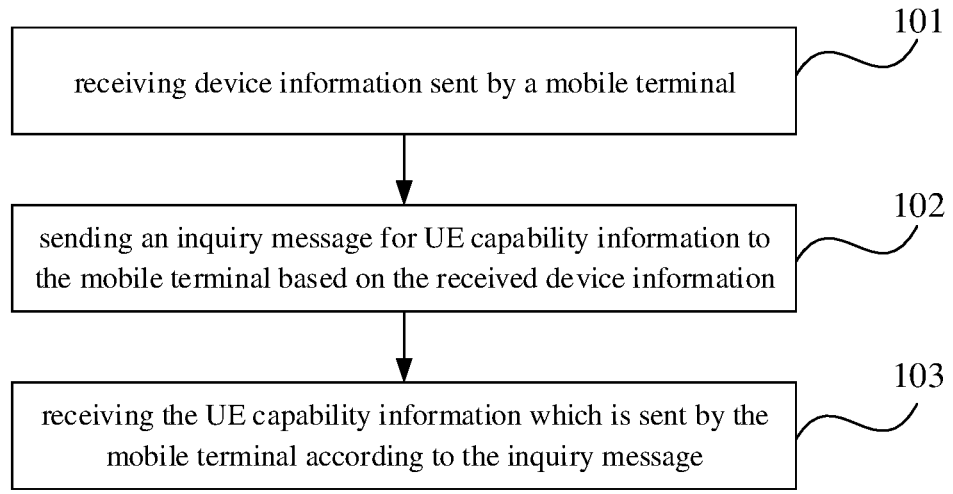
FIG. 1 is a flowchart of a detecting method of a UE capability in some embodiments of the present disclosure.

The technical solutions in some embodiments of the present disclosure will be clearly and completely described below in conjunction with the drawings in some embodiments of the present disclosure. Obviously, the described embodiments are part of the embodiments of the present disclosure, rather than all of the embodiments. Based on the embodiments in the present disclosure, all other embodiments obtained by those of ordinary skill in the art without creative work fall within the scope of the protection of the present disclosure.

In an aspect of some embodiments of the present disclosure, a detecting method of a UE capability, which is applied to a core network, is provided. The UE here refers to a user equipment, such as a mobile terminal.

The detecting method of the UE capability includes:

Step 101: receiving device information sent by a mobile terminal.

The device information mentioned here at least includes identity information of the mobile terminal and location information of the wireless access device (i.e., the physical information corresponding to the address of the wireless access device). The identity information of the mobile terminal at least includes: a medium access control (MAC) address of the mobile terminal, an IP address allocated to the mobile terminal by the wireless access device, an international mobile equipment identity (IMEI) code of the mobile terminal and a temporary mobile subscriber identity (TMSI) code of the mobile terminal.

The wireless access device described herein includes but are not limited to: a wireless router, a wireless access point (Wireless Access Point, AP), and other devices that enable mobile terminals to access the Internet through a wireless local area network. The mobile terminal may access the wireless access device through a wireless local area network (Wireless Local Area Networks, WLAN) module or a satellite communication module set therein.

In some embodiments of the present disclosure, the device information is sent by the mobile terminal when the mobile terminal accesses a wireless access device connected to the Internet. When the mobile terminal accesses the wireless access device connected to the Internet, the mobile terminal sends the device information to the core network. The purpose of uploading the device information by the mobile terminal is to make the core network to have the information of the mobile terminal and the information of the wireless access device connected to the mobile terminal, meanwhile, to notify the core network of connection statuses of the mobile terminal and the wireless access device.

Step 102: sending an inquiry message for UE capability information to the mobile terminal based on the received device information.

Herein, the UE capability information indicates whether an adjustment of a paging period in a standby state is supported. In some embodiments of the present disclosure, the timing for adjusting the paging period is when the mobile terminal is connected to the wireless access device connected to the Internet.

In this step, the core network determines the mobile terminal according to the received device information, and in order to determine the capability of the mobile terminal, the core network sends an inquiry message for the UE capability information to the mobile terminal to determine whether the mobile terminal supports adjusting the paging period in the standby state.

In some embodiments of the present disclosure, a UE capability of a mobile terminal is defined, that is, a capability of adjusting a paging period of monitoring a paging message in a standby state. In the core network side, a UE capability detection mechanism of the mobile terminal is defined, so as to learn whether the mobile terminal has the ability to adjust the paging period in the standby state.

Step 103: receiving the UE capability information which is sent by the mobile terminal according to the inquiry message.

After receiving the inquiry message sent by the core network, the mobile terminal sends the UE capability information to the core network according to the inquiry message, so as to inform the UE capability of the mobile terminal to the core network. The core network receives the UE capability information sent by the mobile terminal, and detects the UE capability of the mobile terminal based on the UE capability information.

Herein, if the mobile terminal supports adjusting the paging period in the standby state, the paging period of monitoring paging messages may be modified during the time when the mobile terminal is connected to the wireless access device connected to the Internet, and the paging message may be monitored according to the modified paging period, so that the paging period may be prolonged and the times of monitoring the paging message may be reduced, thereby reducing the power consumption, saving the power and extending the battery life of the mobile terminal.

For example, the monitoring period of paging specified in the mobile communication standard is 1024 ms, while the first monitoring period of paging in some embodiments of the present disclosure is 3072 ms, so that during the same time duration, the number of times involved that the mobile terminal is awakened is reduced to one-third of the original number of times, the total power consumption is also reduced to one-third of the original power consumption, thereby saving the power consumption.

In some embodiments of the present disclosure, in order to cooperate with the UE capability of the mobile terminal, during the time when the mobile terminal accesses the wireless access device connected to the Internet, the core network schedules the paging path of the paging message from a mobile communication network path to a WLAN path, that is, the paging message are sent to the mobile terminal through the Internet, and the mobile terminal also receives the paging message through the Internet. That is, when the mobile terminal supports adjusting the paging period in the standby state, after the core network receives the UE capability information sent by the mobile terminal, if the core network receives a paging message sent for the mobile terminal and detects that the mobile terminal is still connected to the wireless access device connected to the Internet, the paging message is sent to the mobile terminal through the wireless access device.

Figure 2:
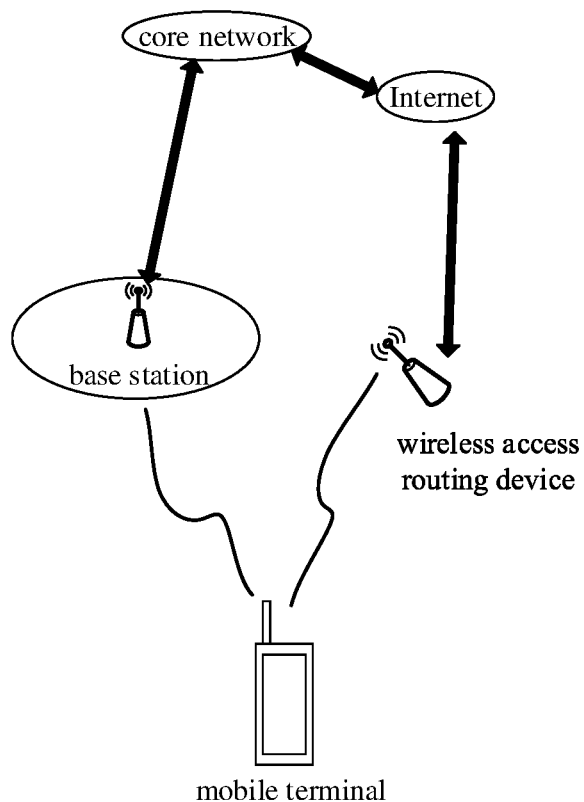
FIG. 2 is a schematic view of a network system in some embodiments of the present disclosure.

As shown in FIG. 2, when the mobile terminal does not access the wireless access device connected to the Internet but the mobile terminal is connected to the wireless access device connected to the Internet, the core network sends a paging message to the mobile terminal through a base station, and the mobile terminal receives the paging message through the base station. At this time, the paging period according to which the mobile terminal monitors the paging message is the paging period specified by the mobile communication standard protocol. When the mobile terminal accesses the wireless access device connected to the Internet, the core network sends a paging message to the mobile terminal through the Internet and wireless access device, and the mobile terminal also receives the paging message through the Internet and wireless access device. At this time, the paging period according to which the mobile terminal monitors the paging message may be the modified paging period.

It should be noted that in order to make the core network to know that the mobile terminal is connected to the wireless access device connected to the Internet, at least the following two methods may be adopted:

Method 1: when receiving the UE capability information reported by the mobile terminal, it defaults to that the mobile terminal is connected to the wireless access device connected to the Internet.

Method 2: the mobile terminal reports the state information to the core network. The state information indicates that the mobile terminal is connected to the wireless access device connected to the Internet.

Rightfully, after the mobile terminal is disconnected from the wireless access device, the mobile terminal may also report to the core network the state information indicating that the mobile terminal is disconnected from the wireless access device connected to the Internet, so that the core network may not only learn that the mobile terminal is connected to the wireless access device but also learn that the mobile terminal is disconnected from the wireless access device. When the core network learns that the mobile terminal is disconnected from the wireless access device, the core network no longer sends a paging message to the mobile terminal through the WLAN path, but sends a paging message to the mobile terminal through the base station.

Further, in some embodiments of the present disclosure, the core network may issue a paging period value, so that the mobile terminal may modify the paging period of monitoring the paging message according to the paging period value issued by the core network.

When the mobile terminal supports adjusting the paging period in the standby state, after the core network receives the UE capability information sent by the mobile terminal, the core network may send a modification instruction of paging period to the mobile terminal based on the UE capability information, so that the mobile terminal may adjust the paging period according to the modification instruction.

Herein, the modification instruction is configured to instruct the mobile terminal to monitor the paging message according to the first paging period.

Herein, the first paging period is greater than a second paging period, and the second paging period is a paging period according to which the mobile terminal monitors the paging message in a case that the mobile terminal does not access the wireless access device connected to the Internet. That is, the paging period, which is equal to a period of sending the paging message by the core network, is specified by the mobile communication standard protocol. That is, during the time when the mobile terminal accesses the wireless access device connected to the Internet, the core network issues the paging message according to the paging period specified by the mobile communication standard protocol, and the mobile terminal monitors the paging message according to the first paging period. When the mobile terminal does not access the wireless access device connected to the Internet, the core network issues the paging message according to the paging period specified by the mobile communication standard protocol, and the mobile terminal monitors the paging message according to the paging period specified by the mobile communication standard protocol.

In order to further understand the methods in some embodiments of the present disclosure, the following takes a 5G network as an example for further description.

Figure 3:
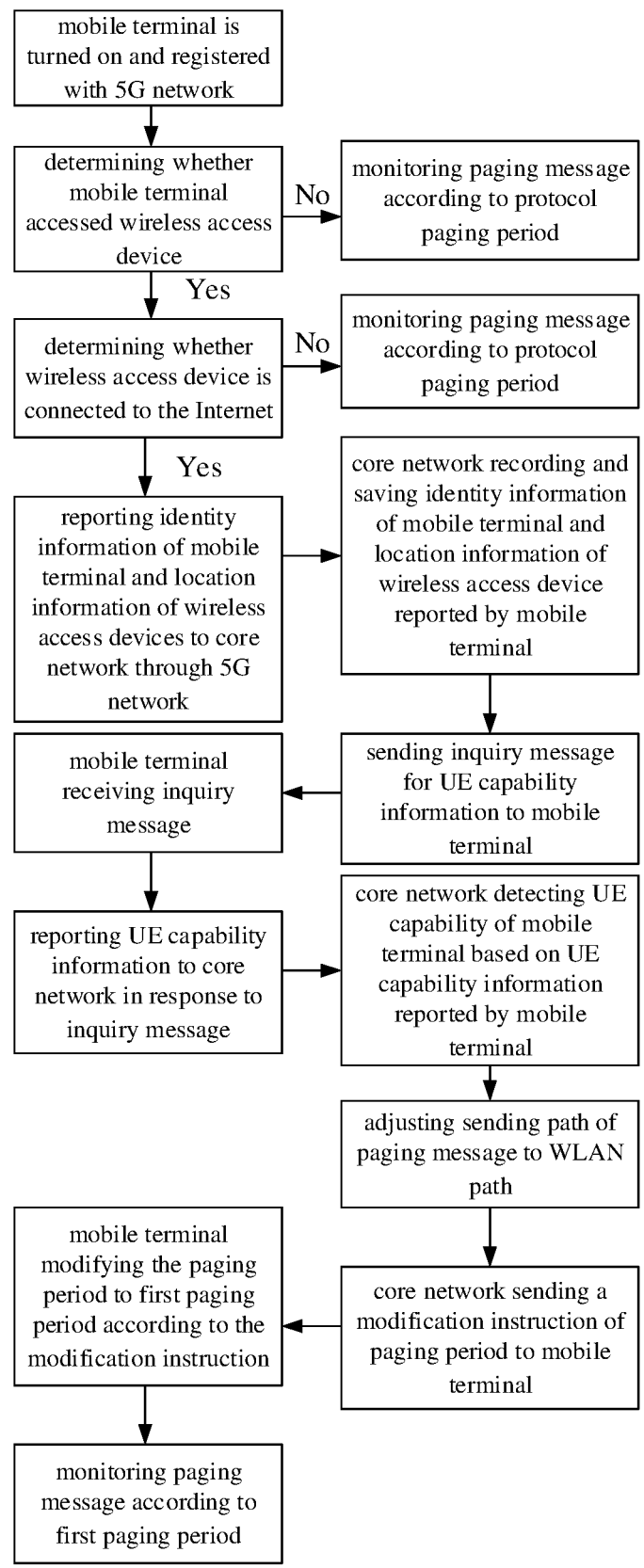
FIG. 3 is a flowchart of an example in some embodiments of the present disclosure.

As shown in FIG. 3, after the mobile terminal is turned on and registered with the 5G network, the mobile terminal determines whether the mobile terminal accessed the wireless access device. If the mobile terminal does not access the wireless access device, the mobile terminal monitors the paging message according to the monitoring period of paging specified in the mobile communication standard (referred to as the protocol paging period). If the mobile terminal has accessed the wireless access device, the mobile terminal determines whether the wireless access device is connected to the Internet. If the wireless access device is not connected to the Internet, the paging message will be monitored according to the protocol paging period; if the wireless access device is connected to the Internet, the mobile terminal reports the identity information of the mobile terminal and the location information of connected wireless access device to the core network through the 5G network.

The core network saves the identity information of the mobile terminal and the location information of the wireless access device reported by the mobile terminal, and then sends an inquiry message for UE capability information to the mobile terminal to inquire whether the mobile terminal supports the ability to adjust the paging period in the standby state. The mobile terminal receives the inquiry message, and reports the UE capability information to the core network according to the inquiry message. The core network detects the UE capability of the mobile terminal based on the UE capability information reported by the mobile terminal, and adjusts the issuing path of the paging message to the WLAN path when the core network learns that the mobile terminal supports the ability to adjust the paging period in the standby state.

The core network issues a modification instruction of paging period to the mobile terminal. After receiving the modification instruction, the mobile terminal modifies the paging period to the first paging period, and monitors the paging message according to the first paging period. In this way, the paging period according to which the mobile terminal monitors the paging message is prolonged, so as to reduce the monitoring times during the same time duration, thereby reducing the power consumption, saving the power and extending the battery life of the mobile terminal.

In summary, according to some embodiments of the present disclosure, a UE capability of a mobile terminal is defined, that is, a capability of adjusting a paging period of monitoring a paging message in a standby state, so that when the mobile terminal supports the ability to adjust the paging period in the standby state, the mobile terminal may extend the paging period of monitoring the paging message, so as to reduce the monitoring times during the same time duration, thereby reducing the power consumption, saving the power and extending the battery life of the mobile terminal. In the core network side, a UE capability detection mechanism of the mobile terminal is defined, so the core network may issue an inquiry message to learn whether the mobile terminal has the ability to adjust the paging period in the standby state. After receiving the inquiry message, the mobile terminal reports its own UE capability according to the inquiry message, thereby determining whether to adjust the issuing path of the paging message based on the UE capability information.

A reporting method of a UE capability, which is applied to a mobile terminal, is provided in another aspect of some embodiments of the present disclosure. The UE mentioned here refers to user equipment such as a mobile terminal.

Figure 4:
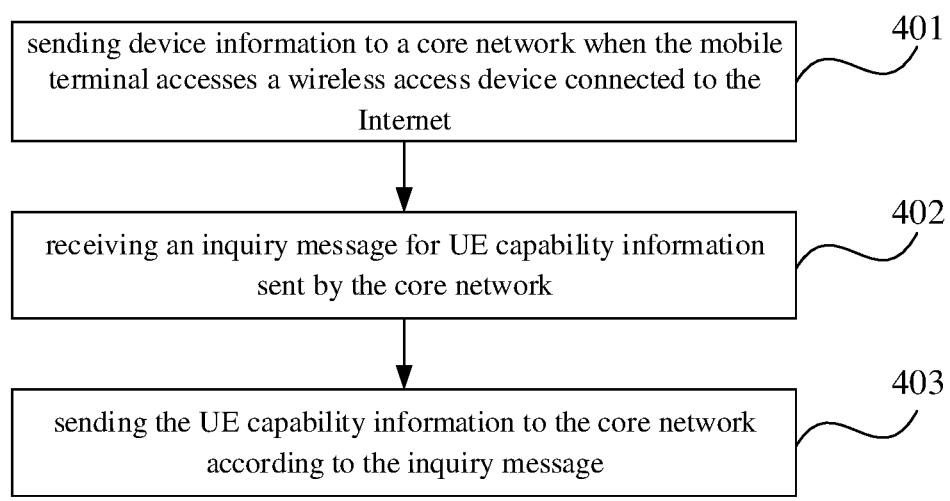
FIG. 4 is a flowchart of a reporting method of a UE capability in some embodiments of the present disclosure.

As shown in FIG. 4, the reporting method of the UE capability includes:

Step 401: sending device information to a core network when the mobile terminal accesses a wireless access device connected to the Internet.

The device information mentioned here at least includes identity information of the mobile terminal and location information of the wireless access device (i.e., the physical information corresponding to the address of the wireless access device). The identity information of the mobile terminal at least includes: a medium access control (MAC) address of the mobile terminal, an IP address allocated to the mobile terminal by the wireless access device, an international mobile equipment identity (IMEI) code of the mobile terminal and a temporary mobile subscriber identity (TMSI) code of the mobile terminal.

The wireless access device described herein include but are not limited to: a wireless router, a wireless access point (Wireless Access Point, AP), and other devices that enable mobile terminals to access the Internet through a wireless local area network. The mobile terminal may access the wireless access device through a wireless local area network (Wireless Local Area Networks, WLAN) module or a satellite communication module set therein.

In some embodiments of the present disclosure, the device information is sent by the mobile terminal when the mobile terminal accesses a wireless access device connected to the Internet. The purpose of uploading device information by the mobile terminal is to make the core network to have the information of the mobile terminal and the information of the wireless access device connected to the mobile terminal, meanwhile to notify the core network of a connection status of the mobile terminal and the wireless access device.

Step 402: receiving an inquiry message for UE capability information sent by the core network.

The inquiry message mentioned here is sent by the core network after the core network receiving the device information. The UE capability information mentioned here refers to whether the adjustment of the paging period in the standby state is supported. In some embodiments of the present disclosure, the timing for adjusting the paging period is when the mobile terminal is connected to the wireless access device connected to the Internet.

The core network determines the mobile terminal according to the device information sent by the mobile terminal, and in order to determine the capability of the mobile terminal, the core network sends an inquiry message for the UE capability information to the mobile terminal to determine whether the mobile terminal supports adjusting the paging period in the standby state.

Step 403: sending the UE capability information to the core network according to the inquiry message.

In this step, the mobile terminal reports its own UE capability information according to the received inquiry message, that is, reporting to the core network the capability information of whether the adjustment of the paging period in the standby state is supported.

Herein, if the mobile terminal supports adjusting the paging period in the standby state, the paging period of monitoring the paging message may be modified during the time when the mobile terminal is connected to the wireless access device connected to the Internet, and the paging message is monitored according to the modified paging period, so that the paging period may be prolonged and the number of times of monitoring the paging message may be reduced, and then the power consumption of the mobile terminal due to monitoring the paging message is reduced.

For example, the monitoring period of paging specified in the mobile communication standard is 1024 ms, while the first monitoring period of paging in some embodiments of the present disclosure is 3072 ms. Hence, during the same time duration, the number of times that the mobile terminal is awakened is reduced to one-third of the original number of times, the total power consumption is also reduced to one-third of the original power consumption, thereby saving the power consumption.

Figure 5:
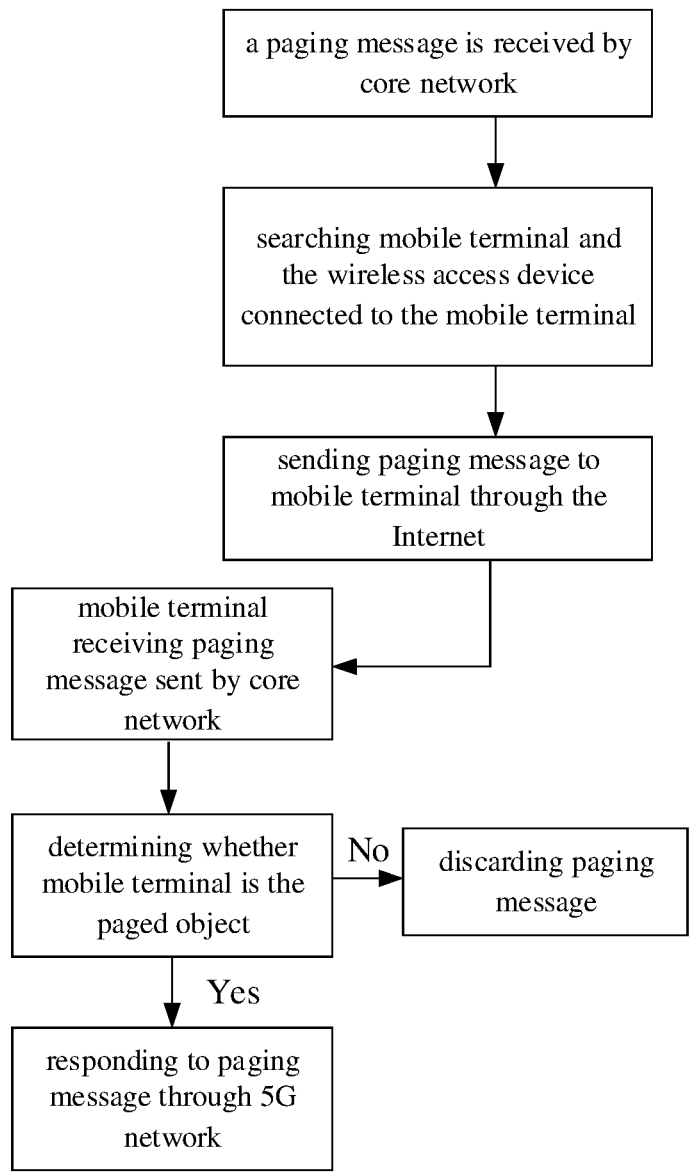
FIG. 5 is a flowchart of an example in some embodiments of the present disclosure.

In some embodiments of the present disclosure, in order to cooperate with the UE capability of the mobile terminal, during the time when the mobile terminal accesses the wireless access device connected to the Internet, the core network schedules the paging path of the paging message from a mobile communication network path to a WLAN path, that is, the paging message are issued to the mobile terminal through the Internet, and the mobile terminal also receives the paging message through the Internet. That is, when the mobile terminal supports adjusting the paging period in the standby state, if the core network receives a paging message sent for the mobile terminal, and detects that the mobile terminal is still connected to the wireless access device connected to the Internet at this time, the core network searches the mobile terminal and the wireless access device connected to the mobile terminal, and sends the paging message to the mobile terminal through the wireless access device (i.e., via the Internet). The mobile terminal receives the paging message through the wireless access device, and determines whether it is the paged object. If so, the mobile terminal responds to the paging message through the mobile communication network (e.g., 5G network); if not, the mobile terminal discards the paging message and continue to sleep, as shown in FIG. 5.

As shown in FIG. 2, when the mobile terminal is not connected to the wireless access device connected to the Internet, the core network sends a paging message to the mobile terminal through the base station, and the mobile terminal receives the paging message through the base station. At this time, the paging period according to which the mobile terminal monitors the paging message is the paging period specified by the mobile communication standard protocol. When the mobile terminal accesses the wireless access device connected to the Internet, the core network sends the paging message to the mobile terminal through the Internet and the wireless access device, and the mobile terminal also receives the paging message through the Internet and wireless access device. At this time, the paging period according to which the mobile terminal monitors the paging message may be a modified paging period.

It should be noted that in order to make the core network to know that the mobile terminal is connected to the wireless access device connected to the Internet, at least the following two methods may be adopted:

Method 1: when receiving the UE capability information reported by the mobile terminal, it defaults to that the mobile terminal is connected to the wireless access device connected to the Internet.

Method 2: the mobile terminal reports to the core network the state information indicating that the mobile terminal is connected to the wireless access device connected to the Internet.

Rightfully, after the mobile terminal is disconnected from the wireless access device, the mobile terminal may also report to the core network the state information indicating that the mobile terminal is disconnected from the wireless access device connected to the Internet, so that the core network may not only learn that the mobile terminal is connected to the wireless access device but also learn that the mobile terminal is disconnected from the wireless access device. When the core network learns that the mobile terminal is disconnected from the wireless access device, the core network no longer sends a paging message to the mobile terminal through the WLAN path, but sends a paging message to the mobile terminal through the base station.

Further, when the mobile terminal supports adjusting the paging period in the standby state, after sending the UE capability information to the core network, the paging period of monitoring the paging message may be modified to the first paging period, and the paging message is monitored according to the first paging period.

Herein, the first paging period is greater than a second paging period, and the second paging period is a paging period according to which the mobile terminal monitors the paging message in a case that the mobile terminal does not access the wireless access device connected to the Internet, that is, the paging period specified by the mobile communication standard protocol, and is also equal to a period of issuing the paging message by the core network.

During the time when the mobile terminal accesses the wireless access device connected to the Internet, the core network issues the paging message according to the paging period specified by the mobile communication standard protocol, and the mobile terminal monitors the paging message according to the first paging period. When the mobile terminal does not access the wireless access device connected to the Internet, the core network issues the paging message according to the paging period specified by the mobile communication standard protocol, and the mobile terminal monitors the paging message according to the paging period specified by the mobile communication standard protocol.

Specifically, in some embodiments of the present disclosure, when the mobile terminal modifies the paging period of monitoring the paging message to the first paging period, the mobile terminal may automatically modify the paging period to the first paging period based on the preset period value in the mobile terminal, the mobile terminal may also be controlled by the core network to modify the paging period. For example, when the mobile terminal supports adjusting the paging period in the standby state, after the core network receives the UE capability information sent by the mobile terminal, the core network sends a modification instruction of paging period to the mobile terminal according to the UE capability information. The mobile terminal receives the modification instruction, and modifies the paging period to the first paging period according to the modification instruction. The modification instruction is configured to instruct the mobile terminal to monitor the paging message according to the first paging period.

Finally, it should be noted that, in some embodiments of the present disclosure, the core network issues the paging message at the same period which is still the period specified in the mobile communication standard, but the paging period of the mobile terminal will change.

In summary, according to some embodiments of the present disclosure, a UE capability of a mobile terminal is defined, that is, a capability of adjusting a paging period of monitoring a paging message in a standby state, so that when the mobile terminal supports the ability to adjust the paging period in the standby state, the mobile terminal may extend the paging period of monitoring the paging message, so as to reduce the monitoring times during the same time duration, thereby reducing the power consumption, saving the power and extending the battery life of the mobile terminal. In the core network side, a UE capability detection mechanism of the mobile terminal is defined, so the core network may issue an inquiry message to learn whether the mobile terminal has the ability to adjust the paging period in the standby state. After receiving the inquiry message, the mobile terminal reports its own UE capability according to the inquiry message, thereby determining whether to adjust the sending path of the paging message based on the UE capability information.

A server is provided in another aspect of some embodiments of the present disclosure.

Figure 6:
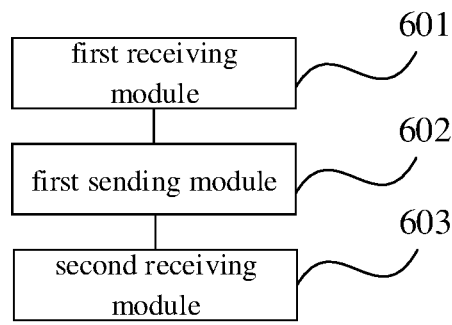
FIG. 6 is a first block diagram of a server in some embodiments of the present disclosure.

As shown in FIG. 6, the server includes:

a first receiving module 601, configured to receive device information sent by a mobile terminal, where the device information is sent by the mobile terminal when the mobile terminal accesses a wireless access device connected to the Internet, and the device information at least includes identity information of the mobile terminal and location information of the wireless access device, and the identity information at least includes: a medium access control (MAC) address of the mobile terminal, an IP address allocated to the mobile terminal by the wireless access device, an international mobile equipment identity (IMEI) code of the mobile terminal and a temporary mobile subscriber identity (TMSI) code of the mobile terminal.

a first sending module 602, configured to send an inquiry message for UE capability information to the mobile terminal based on the device information received by the first receiving module, where the UE capability information indicates whether an adjustment of a paging period in a standby state is supported; and a second receiving module 603, configured to receive the UE capability information which is sent by the mobile terminal according to the inquiry message.

Figure 7:
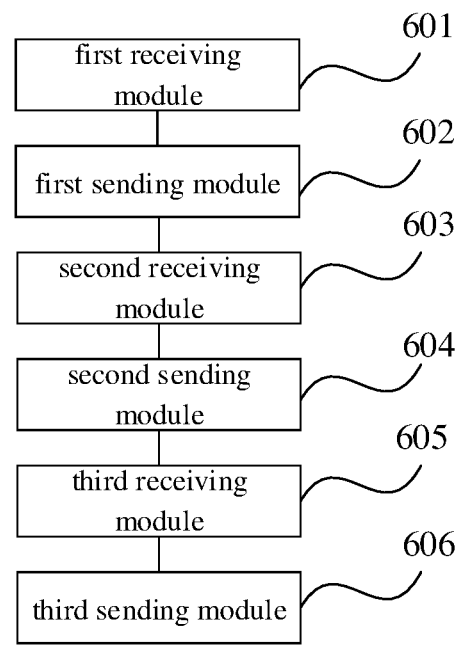
FIG. 7 is a second block diagram of a server in some embodiments of the present disclosure.

As shown in FIG. 7, the server further includes:

a second sending module 604, configured to send a modification instruction of paging period to the mobile terminal based on the UE capability information, where the modification instruction is configured to instruct the mobile terminal to monitor the paging message according to a first paging period, where the first paging period is greater than a second paging period, and the second paging period is a paging period according to which the mobile terminal monitors the paging message in a case that the mobile terminal does not access the wireless access device connected to the Internet, which is the paging period specified by the mobile communication standard protocol, and is also equal to a period of issuing the paging message by the core network.

As shown in FIG. 7, the server further includes:

a third receiving module 605, configured to receive a paging message sent for the mobile terminal; and a third sending module 606, configured to send the paging message to the mobile terminal through the wireless access device.

In summary, according to some embodiments of the present disclosure, a UE capability of a mobile terminal is defined, that is, a capability of adjusting a paging period of monitoring a paging message in a standby state, so that when the mobile terminal supports the ability to adjust the paging period in the standby state, the mobile terminal may extend the paging period of monitoring the paging message, so as to reduce the monitoring times during the same time duration, thereby reducing the power consumption, saving the power and extending the battery life of the mobile terminal. In the core network side, a UE capability detection mechanism of the mobile terminal is defined, when the first receiving module 601 receives the device information sent by the core work, the core network may issue an inquiry message to learn whether the mobile terminal has the ability to adjust the paging period in the standby state through the first sending module 602. After receiving the inquiry message, the mobile terminal reports its own UE capability according to the inquiry message, the core network receives the UE capability information reported by the mobile terminal through the second receiving module 603, so as to determine whether to adjust the sending path of the paging message based on the UE capability information.

A mobile terminal is provided in another aspect of some embodiments of the present disclosure.

Figure 8:
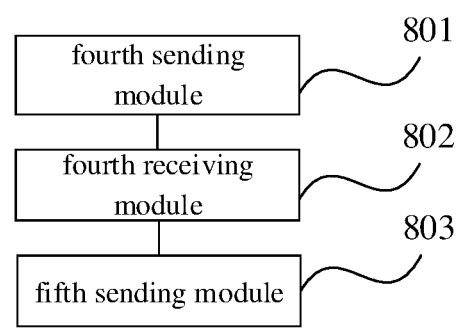
FIG. 8 is a first block diagram of a mobile terminal in some embodiments of the present disclosure.

As shown in FIG. 8, the mobile terminal includes:

a fourth sending module 801, configured to send device information to a core network when the mobile terminal accesses a wireless access device connected to the Internet, where the device information at least includes identity information of the mobile terminal and location information of the wireless access device, and the identity information at least includes: a medium access control (MAC) address of the mobile terminal, an IP address allocated to the mobile terminal by the wireless access device, an international mobile equipment identity (IMEI) code of the mobile terminal and a temporary mobile subscriber identity (TMSI) code of the mobile terminal.

a fourth receiving module 802, configured to receive an inquiry message, which is sent by the core network, for UE capability information, where the inquiry message is sent by the core network after the device information is received by the core network, and the UE capability information indicates whether an adjustment of a paging period in a standby state is supported; and a fifth sending module 803, configured to send the UE capability information to the core network according to the inquiry message.

Figure 9:
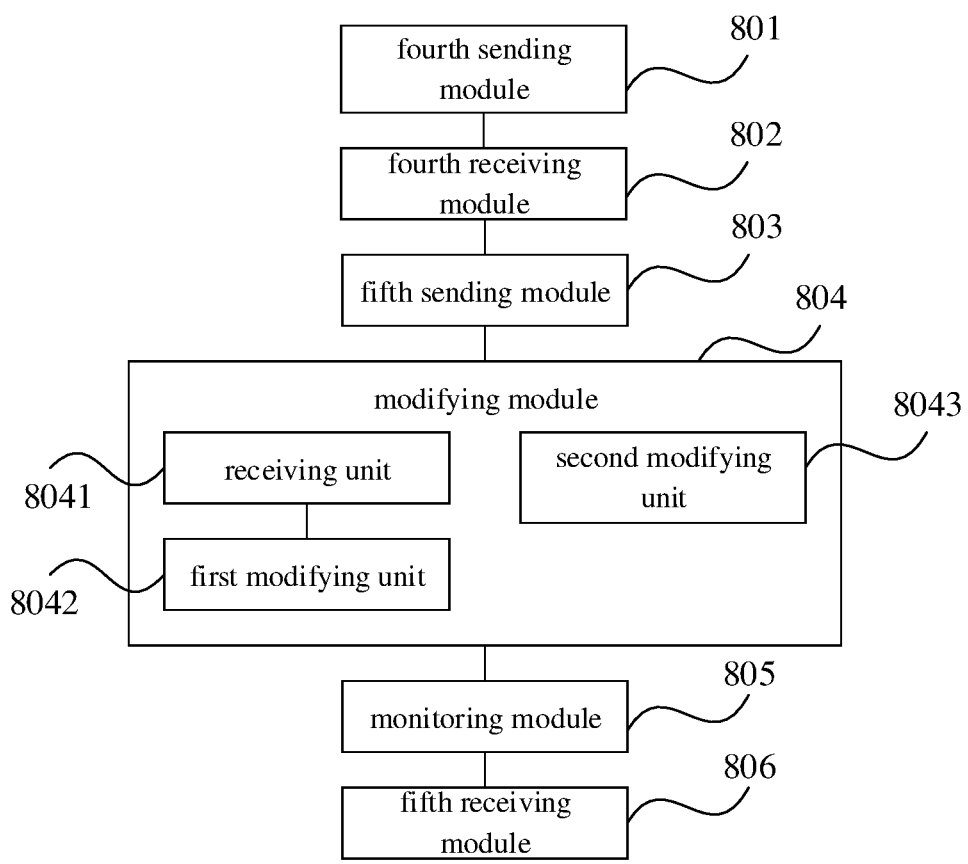
FIG. 9 is a second block diagram of a mobile terminal in some embodiments of the present disclosure.

Furthermore, as shown in FIG. 9, the mobile terminal further includes:

a modifying module 804, configured to modify a paging period of monitoring a paging message to a first paging period, where the first paging period is greater than a second paging period, and the second paging period is a paging period according to which the mobile terminal monitors the paging message in a case that the mobile terminal does not access the wireless access device connected to the Internet, which is the paging period specified by the mobile communication standard protocol, and is also equal to a period of sending the paging message by the core network.; and a monitoring module 805, configured to monitor the paging message according to the first paging period.

Furthermore, as shown in FIG. 9, the modifying module 804 further includes:

a receiving unit 8041, configured to receive a modification instruction of paging period which is sent by the core network based on the UE capability information, where the modification instruction is configured to instruct the mobile terminal to monitor the paging message according to the first paging period; and a first modifying unit 8042, configured to modify the paging period to the first paging period according to the modification instruction.

Furthermore, as shown in FIG. 9, the modifying module 804 further includes:

a second modifying unit 8043, configured to modify the paging period to the first paging period according to a preset period value.

Furthermore, as shown in FIG. 9, the mobile terminal further includes:

a fifth receiving module 806, configured to receive the paging message which is sent by the core network through the wireless access device.

In summary, according to some embodiments of the present disclosure, a UE capability of a mobile terminal is defined, that is, a capability of adjusting a paging period of monitoring a paging message in a standby state, so that when the mobile terminal supports the ability to adjust the paging period in the standby state, the mobile terminal may extend the paging period of monitoring the paging message, so as to reduce the monitoring times during the same time duration, thereby reducing the power consumption, saving the power and extending the battery life of the mobile terminal. In the core network side, a UE capability detection mechanism of the mobile terminal is defined, when the core network receives the device information which is sent by the mobile terminal through the fourth sending module 801, the core network may issue an inquiry message to learn whether the mobile terminal has the ability to adjust the paging period in the standby state. After receiving the inquiry message through the fourth receiving module 802, the mobile terminal reports its own UE capability according to the inquiry message through the fifth sending module 803, the core network receives the UE capability information reported by the mobile terminal, so as to determine whether to adjust the sending path of the paging message based on the UE capability information.

Figure 10:
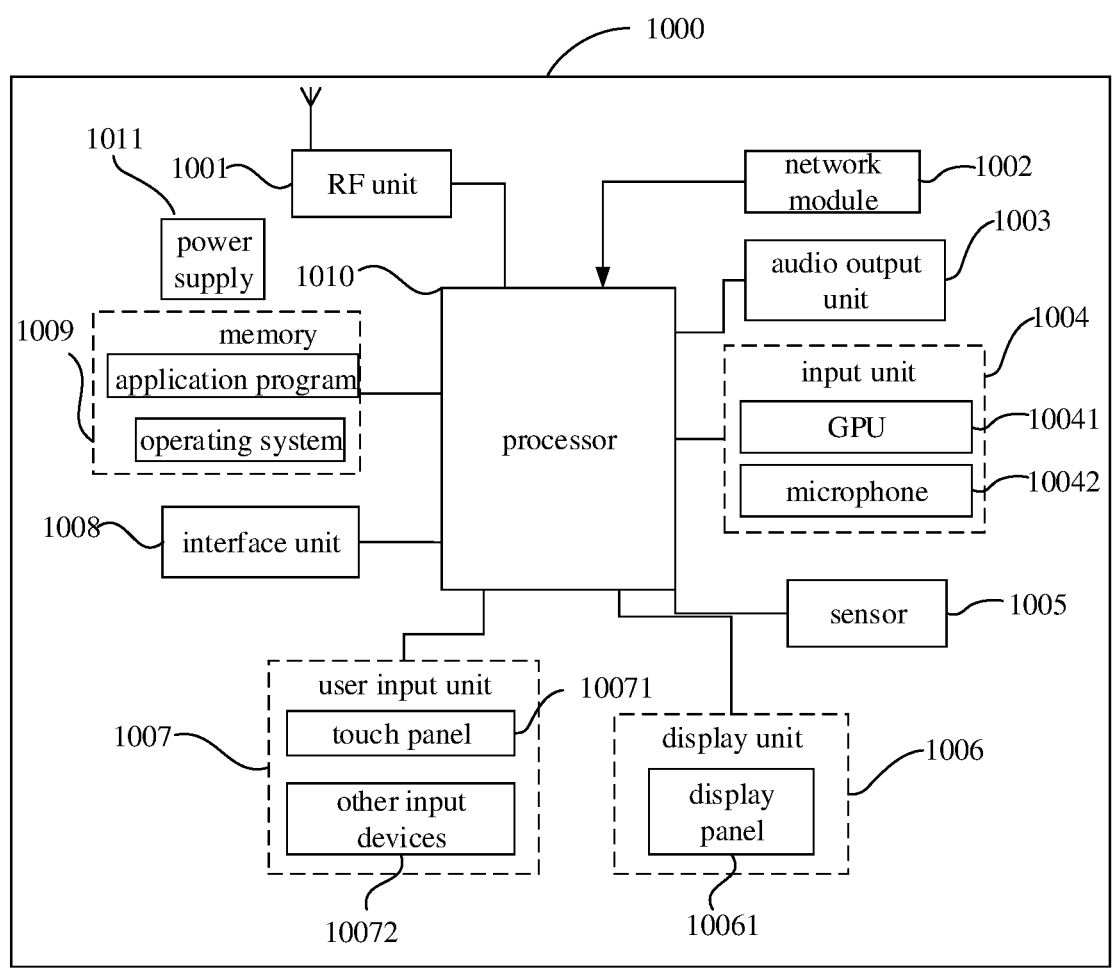
FIG. 10 is a third block diagram of a mobile terminal in some embodiments of the present disclosure.

FIG. 10 is a schematic view of a hardware structure of a mobile terminal in some embodiments of the present disclosure.

The mobile terminal 1000 includes but is not limited to: radio frequency unit 1001, network module 1002, audio output unit 1003, input unit 1004, sensor 1005, display unit 1006, user input unit 1007, interface unit 1008, memory 1009, processor 1010, and Power supply 1011 and other components.

Those skilled in the art can understand that the structure of the mobile terminal shown in FIG. 10 does not limit the mobile terminal. The mobile terminal may include more or less components than those shown in the drawings, or a combination of certain components, or different components, or different component layouts. In some embodiments of the present disclosure, the mobile terminals include, but are not limited to, mobile phones, tablet computers, notebook computers, palmtop computers, vehicle-mounted terminals, wearable devices, and pedometers.

The processor 1010 is configured to: receive device information sent by a mobile terminal, send an inquiry message for UE capability information to the mobile terminal based on the device information, and receive the UE capability information which is sent by the mobile terminal according to the inquiry message.

The device information is sent by the mobile terminal when the mobile terminal accesses a wireless access device connected to the Internet, and the device information at least includes identity information of the mobile terminal and location information of the wireless access device.

The UE capability information indicates whether an adjustment of a paging period in a standby state is supported.

According to some embodiments of the present disclosure, a UE capability of a mobile terminal is defined, that is, a capability of adjusting a paging period of monitoring a paging message in a standby state, so that when the mobile terminal supports the capability of adjusting the paging period in the standby state, the mobile terminal may extend the paging period of monitoring the paging message, so as to reduce the monitoring times during the same time duration, thereby reducing the power consumption, saving the power and extending the battery life of the mobile terminal. In the core network side, a UE capability detection mechanism of the mobile terminal is defined, so as to learn whether the mobile terminal has the ability to adjust the paging period in the standby state.

It should be understood that, in some embodiments of the present disclosure, the radio frequency unit 1001 may be used for receiving and sending signals during the process of sending and receiving information or talking. Specifically, the downlink data from the base station is received and processed by the processor 1010; in addition, the uplink data is sent to the base station. Generally, the radio frequency unit 1001 includes, but is not limited to, an antenna, at least one amplifier, a transceiver, a coupler, a low noise amplifier, a duplexer, and the like. In addition, the radio frequency unit 1001 may also communicate with the network and other devices through a wireless communication system.

The mobile terminal provides users with wireless broadband Internet access through the network module 1002, such as helping users to send and receive emails, browse web pages, and access streaming media.

The audio output unit 1003 may convert the audio data received by the radio frequency unit 1001 or the network module 1002 or stored in the memory 1009 into audio signals and output them as sounds. Moreover, the audio output unit 1003 may also provide audio output related to a specific function performed by the mobile terminal 1000 (for example, call signal reception sound, message reception sound, etc.). The audio output unit 1003 includes a speaker, a buzzer, a receiver, and the like.

The input unit 1004 is used to receive audio or video signals. The input unit 1004 may include a graphics processing unit (GPU) 10041 and a microphone 10042, and the graphics processor 10041 is configured to process the image data of the still pictures or video images obtained by an image capture device (such as a camera) in a video capture mode or an image capture mode. The processed image frame may be displayed on the display unit 1006. The image frame processed by the graphics processor 10041 may be stored in the memory 1009 (or other storage medium) or sent via the radio frequency unit 1001 or the network module 1002. The microphone 10042 can receive sound, and can process such sound into audio data. The processed audio data may be converted into a format that may be sent to a mobile communication base station via the radio frequency unit 1001 in the case of a telephone call mode for output.

The mobile terminal 1000 further includes at least one sensor 1005, such as a light sensor, a motion sensor, and other sensors. Specifically, the light sensor includes an ambient light sensor and a proximity sensor. The ambient light sensor can adjust the brightness of the display panel 10061 according to the brightness of the ambient light. The proximity sensor can close the display panel 10061 and/or the backlight when the mobile terminal 1000 is moved to the ear. As a kind of motion sensor, the accelerometer sensor can detect the magnitude of acceleration in various directions (usually three-axis), and can detect the magnitude and direction of gravity when it is stationary, and may be used to identify the posture of the mobile terminal (such as horizontal and vertical screen switching, related games), Magnetometer attitude calibration), vibration recognition related functions (such as pedometer, tap), etc.; sensor 1005 can also include fingerprint sensors, pressure sensors, iris sensors, molecular sensors, gyroscopes, barometers, hygrometers, thermometers, Infrared sensors, etc., will not be repeated here.

The display unit 1006 is used to display information input by the user or information provided to the user. The display unit 1006 may include a display panel 10061, and the display panel 10061 may be configured in the form of a liquid crystal display (Liquid Crystal Display, LCD), an organic light-emitting diode (Organic Light-Emitting Diode, OLED), etc.

The user input unit 1007 may be used to receive inputted numeric or character information, and generate key signal input related to user settings and function control of the mobile terminal. Specifically, the user input unit 1007 includes a touch panel 10071 and an input device 10072. The touch panel 10071, also called a touch screen, can collect user touch operations on or near it (for example, the user uses any suitable objects or accessories such as fingers, stylus, etc.) on the touch panel 10071 or near the touch panel 10071). The touch panel 10071 may include two parts, a touch detection device and a touch controller. The touch detection device detects the user's touch position, and detects the signal brought by the touch operation, and transmits the signal to the touch controller; the touch controller receives the touch information from the touch detection device, converts it into contact coordinates, and then sends the contact coordinates to the processor 1010, and then the processor 1010 receives and executes the command sent by the processor 1010. In addition, the touch panel 10071 may be implemented in multiple types such as resistive, capacitive, infrared, and surface acoustic wave. In addition to the touch panel 10071, the user input unit 1007 may also include an input device 10072. Specifically, the input device 10072 may include, but is not limited to, a physical keyboard, function keys (such as volume control buttons, switch buttons, etc.), trackball, mouse, and joystick, which will not be repeated here.

Further, the touch panel 10071 may be overlaid on the display panel 10061. When the touch panel 10071 detects a touch operation on or near it, it transmits it to the processor 1010 to determine the type of the touch event, and then the processor 1010 determines the type of the touch event according to the touch. The type of event provides corresponding visual output on the display panel 10061. Although in FIG. 10, the touch panel 10071 and the display panel 10061 are used as two independent components to implement the input and output functions of the mobile terminal, in some embodiments, the touch panel 10071 and the display panel 10061 may be integrated to implement the input and output functions of the mobile terminal is not specifically limited here.

The interface unit 1008 is an interface for connecting an external device with the mobile terminal 1000. For example, the external device may include a wired or wireless headset port, an external power source (or battery charger) port, a wired or wireless data port, a memory card port, a port for connecting a device with an identification module, audio input/output (I/O) port, video I/O port, headphone port, etc. The interface unit 1008 may be used to receive input (for example, data information, power, etc.) from an external device and transmit the received input to one or more elements in the mobile terminal 1000 or may be used to perform the data transmission between the mobile terminal 1000 and external devices.

The memory 1009 may be used to store software programs and various data. The memory 1009 may mainly include a program storage area and a data storage area. The program storage area may store an operating system, an application program required by at least one function (such as a sound playback function, an image playback function, etc.), etc.; the data storage area stores data (such as audio data, phone book, etc.) created by the use of mobile phones. In addition, the memory 1009 may include a high-speed random access memory, and may also include a non-volatile memory, such as at least one magnetic disk storage device, a flash memory device, or other volatile solid-state storage devices.

The processor 1010 is the control center of the mobile terminal. It uses various interfaces and lines to connect the various parts of the entire mobile terminal, runs or executes software programs and/or modules stored in the memory 1009, and calls data stored in the memory 1009 to perform various functions of the mobile terminal and process data, so as to monitor the mobile terminal as a whole. The processor 1010 may include one or more processing units; optionally, the processor 1010 may integrate an application processor and a modem processor, where the application processor mainly processes the operating system, user interface and application programs, etc. The modulation processor mainly deals with wireless communication. It may be understood that the foregoing modulation processor may not be integrated into the processor 1010.

The mobile terminal 1000 may also include a power supply 1011 (such as a battery) for supplying power to various components. Optionally, the power supply 1011 may be logically connected to the processor 1010 through a power management system, so as to manage charging, discharging, and power consumption management and other functions through the power management system.

In addition, the mobile terminal 1000 includes some functional modules not shown, which will not be described here.

Optionally, a mobile terminal is further provided in some embodiments of the present disclosure, including a processor 1010, a memory 1009, a computer program stored in the memory 1009 and executable on the processor 1010, and the processor executes the computer program to perform the reporting method of the UE capability hereinabove, and the same technical effect may be achieved. To avoid repetition, details are not described here.

A computer-readable storage medium is provided in some embodiments of the present disclosure, including a computer program stored in the computer-readable storage medium, where the processor executes the computer program to perform the reporting method of the UE capability hereinabove, and may achieve the same technical effect, in order to avoid repetition, details thereof will not be repeated here. The computer-readable storage medium, such as read-only memory (Read-Only Memory, ROM), random access memory (Random Access Memory, RAM), magnetic disk, or optical disk, etc.

Figure 11:
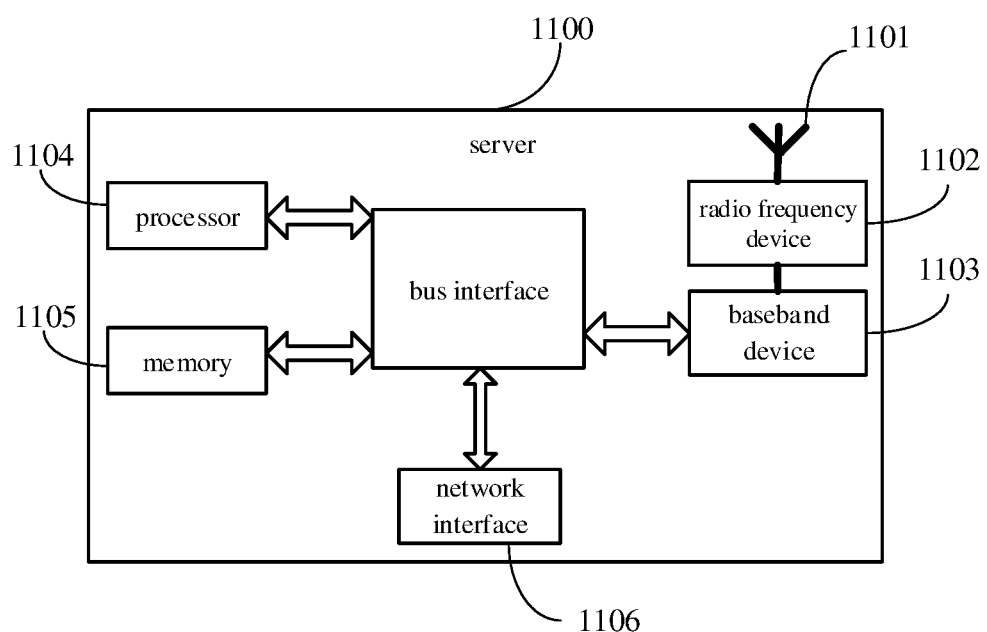
FIG. 11 is a third block diagram of a server in some embodiments of the present disclosure.

A server is provided in another aspect of some embodiments of the present disclosure. As shown in FIG. 11, the server 1100 includes: an antenna 1101, a radio frequency device 1102, and a baseband device 1103. The antenna 1101 is connected to the radio frequency device 1102. In the uplink direction, the radio frequency device 1102 receives information through the antenna 1101, and sends the received information to the baseband device 1103 for processing. In the downlink direction, the baseband device 1103 processes the information to be sent and sends it to the radio frequency device 1102, and the radio frequency device 1102 processes the received information and sends it out via the antenna 1101.

The foregoing frequency band processing apparatus may be located in the baseband apparatus 1103, and the method executed by the server in the above embodiment may be implemented in the baseband apparatus 1103. The baseband apparatus 1103 includes a processor 1104 and a memory 1105.

The baseband device 1103 may include, for example, at least one baseband board, and multiple chips are arranged on the baseband board, as shown in FIG. 11. One of the chips is, for example, a processor 1104, which is connected to a memory 1105 to call programs in the memory 1105 and execute the server operation shown in the above method embodiment.

The baseband device 1103 may also include a network interface 1106 for exchanging information with the radio frequency device 1102. The interface is, for example, a common public radio interface (CPRI).

The processor here may be a processor or a collective term for multiple processing elements. For example, the processor may be a CPU or an ASIC, or it may be configured to implement one or more of the methods executed by the above server Integrated circuits, such as: one or more microprocessors DSP, or, one or more field programmable gate array FPGAs, etc. The storage element may be a memory or a collective term for multiple storage elements.

The memory 1105 may be volatile memory or non-volatile memory, or may include both volatile and non-volatile memory. The non-volatile memory may be a read-only memory (Read-Only Memory, ROM), a programmable read-only memory (Programmable ROM, PROM), and an erasable programmable read-only memory (Erasable PROM, EPROM), Electrically Erasable Programmable Read Only Memory (Electrically EPROM, EEPROM) or flash memory. The volatile memory may be a random access memory (Random Access Memory, RAM), which is used as an external cache. By way of exemplary but not restrictive description, many forms of RAM are available, such as static random access memory (Static RAM, SRAM), dynamic random access memory (Dynamic RAM, DRAM), and synchronous dynamic random access memory (Synchronous RAM). DRAM, referred to as SDRAM), double data rate synchronous dynamic random access memory (Double Data Rate SDRAM, referred to as DDRSDRAM), enhanced synchronous dynamic random access memory (Enhanced SDRAM, referred to as ESDRAM), synchronously connected dynamic random access memory (Synchlink DRAM, SLDRAM) and Direct Rambus RAM (DR-RAM). The memory 1105 described in this application is intended to include, but is not limited to, these and any other suitable types of memory.

Specifically, the processor 1104 is configured to: send device information to a core network when the mobile terminal accesses a wireless access device connected to the Internet, receive an inquiry message, which is sent by the core network, for UE capability information, and send the UE capability information to the core network according to the inquiry message.

The device information at least includes identity information of the mobile terminal and location information of the wireless access device.

The inquiry message is sent by the core network after the device information is received by the core network, and the UE capability information indicates whether an adjustment of a paging period in a standby state is supported.

The server may be the base station (Base Transceiver Station, referred to as BTS) in Global System of Mobile Communications (GSM) or Code Division Multiple Access (Code Division Multiple Access, referred to as CDMA), or it may be broadband code division The base station (NodeB, NB) in Wideband Code Division Multiple Access (WCDMA), or the Evolutional NodeB (eNB or eNodeB) in LTE, or a relay station or access point, or The base stations in the future 5G network are not limited here.

According to some embodiments of the present disclosure, a UE capability of a mobile terminal is defined, that is, a capability of adjusting a paging period of monitoring a paging message in a standby state, so that when the mobile terminal supports the capability of adjusting the paging period in the standby state, the mobile terminal may extend the paging period of monitoring the paging message, so as to reduce the monitoring times during the same time duration, thereby reducing the power consumption, saving the power and extending the battery life of the mobile terminal. In the core network side, a UE capability detection mechanism of the mobile terminal is defined, so as to learn whether the mobile terminal has the ability to adjust the paging period in the standby state.

Optionally, a server is further provided in some embodiments of the present disclosure, including a processor 1104, a memory 1105, a computer program stored in the memory 1105 and executable on the processor 1104, and the processor 1104 executes the computer program to perform the detecting method of the UE capability, and the same technical effect may be achieved. To avoid repetition, details thereof are not repeated here.

A computer-readable storage medium is provided in some embodiments of the present disclosure, including a computer program stored in the computer-readable storage medium, where the processor executes the computer program to perform the detecting method of the UE capability hereinabove, and may achieve the same technical effect, in order to avoid repetition, details thereof will not be repeated here. The computer-readable storage medium, such as read-only memory (Read-Only Memory, ROM), random access memory (Random Access Memory, RAM), magnetic disk, or optical disk, etc.

It should be noted that the computer-readable storage medium provided in the present disclosure may be a volatile computer-readable storage medium or a non-volatile computer-readable storage medium.

It should be noted that in this article, the terms "includes", "including" or any other variants thereof are intended to cover non-exclusive inclusion, so that a process, method, article or device including a series of elements not only includes those elements, It also includes other elements not explicitly listed, or elements inherent to the process, method, article, or device. Without more restrictions, the element defined by the sentence "including a . . . " does not exclude the existence of other identical elements in the process, method, article or device that includes the element.

Based on the description of the above embodiments, those skilled in the art may clearly understand that the method of the above embodiments may be implemented by means of software plus the necessary general hardware platform. Of course, it can also be achieved by hardware, but in many cases the former is better. Based on this understanding, the technical solution of the present disclosure essentially or for the part that contributes to the related technology may be embodied in the form of a software product, and the computer software product is stored in a storage medium (such as ROM/RAM, magnetic disk, optical disk)) and includes several instructions to make a terminal (which may be a mobile phone, a computer, a server, an air conditioner, or a network device, etc.) to execute the method described in the embodiments of the present disclosure.

The embodiments of the present disclosure are described above with reference to the drawings, but the present disclosure is not limited to the above embodiments. The above embodiments are only illustrative and not restrictive. Those of ordinary skill in the art, under the enlightenment of the present disclosure, may make many forms without departing from the purpose of the present disclosure and the scope of the claims, all of which fall within the scope of the present disclosure.

What is claimed is:

1. A detecting method of a UE capability, performed by a core network, comprising:

receiving device information sent by a mobile terminal, wherein the device information is sent by the mobile terminal when the mobile terminal accesses a wireless access device connected to the Internet, the wireless access device is a device that enables the mobile terminal to access the Internet through a wireless local area network, and the device information at least comprises identity information of the mobile terminal and location information of the wireless access device;

sending an inquiry message for UE capability information to the mobile terminal based on the device information, wherein the UE capability information indicates an adjustment of a paging period in a standby state is supported; and receiving the UE capability information which is sent by the mobile terminal according to the inquiry message, wherein the mobile terminal supports adjusting the paging period in the standby state, subsequent to the receiving the UE capability information which is sent by the mobile terminal according to the inquiry message, the method further comprises:

sending a modification instruction of paging period to the mobile terminal based on the UE capability information, wherein the modification instruction is configured to instruct the mobile terminal to monitor the paging message according to a first paging period, the first paging period is greater than a second paging period, the first paging period is a paging period according to which the mobile terminal monitors the paging message in a case that the mobile terminal accesses the wireless access device connected to the Internet, and the second paging period is a paging period according to which the mobile terminal monitors the paging message in a case that the mobile terminal does not access the wireless access device connected to the Internet.

2. The method according to claim 1, wherein in a case that the mobile terminal supports adjusting the paging period in the standby state, subsequent to the receiving the UE capability information which is sent by the mobile terminal according to the inquiry message, the method further comprises:

receiving a paging message sent for the mobile terminal; and sending the paging message to the mobile terminal through the wireless access device.

3. The method according to claim 1, wherein the identity information at least comprises: a medium access control (MAC) address of the mobile terminal, an IP address allocated to the mobile terminal by the wireless access device, an international mobile equipment identity (IMEI) code of the mobile terminal and a temporary mobile subscriber identity (TMSI) code of the mobile terminal.

4. A reporting method of UE capability, performed by a mobile terminal, comprising:

sending device information to a core network when the mobile terminal accesses a wireless access device connected to the Internet, wherein the wireless access device is a device that enables the mobile terminal to access the Internet through a wireless local area network, the device information at least comprises identity information of the mobile terminal and location information of the wireless access device;

receiving an inquiry message, which is sent by the core network, for UE capability information, wherein the inquiry message is sent by the core network after the device information is received by the core network, and the UE capability information indicates an adjustment of a paging period in a standby state is supported; and sending the UE capability information to the core network according to the inquiry message, wherein the mobile terminal supports adjusting the paging period in the standby state, subsequent to the sending the UE capability information to the core network according to the inquiry message, the method further comprises:

modifying a paging period of monitoring a paging message to a first paging period, wherein the first paging period is greater than a second paging period, the first paging period is a paging period according to which the mobile terminal monitors the paging message in a case that the mobile terminal accesses the wireless access device connected to the Internet, and the second paging period is a paging period according to which the mobile terminal monitors the paging message in a case that the mobile terminal does not access the wireless access device connected to the Internet; and monitoring the paging message according to the first paging period.

5. The method according to claim 4, wherein the modifying the paging period of monitoring the paging message to the first paging period comprises:

receiving a modification instruction of paging period which is sent by the core network based on the UE capability information, wherein the modification instruction is configured to instruct the mobile terminal to monitor the paging message according to the first paging period; and modifying the paging period to the first paging period according to the modification instruction.

6. The method according to claim 4, wherein the modifying the paging period of monitoring the paging message to the first paging period comprises:

modifying the paging period to the first paging period according to a preset period value.

7. The method according to claim 4, wherein in a case that the mobile terminal supports adjusting the paging period in the standby state, subsequent to the sending the UE capability information to the core network according to the inquiry message, the method further comprises:

receiving the paging message which is sent by the core network through the wireless access device.

8. The method according to claim 4, wherein the identity information at least comprises: a medium access control (MAC) address of the mobile terminal, an IP address allocated to the mobile terminal by the wireless access device, an international mobile equipment identity (IMEI) code of the mobile terminal and a temporary mobile subscriber identity (TMSI) code of the mobile terminal.

9. A core network, comprising: a processor, a memory, and a computer program stored in the memory and executable on the processor, wherein the processor executes the computer program to:

receive device information sent by a mobile terminal, wherein the device information is sent by the mobile terminal when the mobile terminal accesses a wireless access device connected to the Internet, the wireless access device is a device that enables the mobile terminal to access the Internet through a wireless local area network, and the device information at least comprises identity information of the mobile terminal and location information of the wireless access device;

send an inquiry message for UE capability information to the mobile terminal based on the device information, wherein the UE capability information indicates an adjustment of a paging period in a standby state is supported; and receive the UE capability information which is sent by the mobile terminal according to the inquiry message, wherein the processor executes the computer program to:

send a modification instruction of paging period to the mobile terminal based on the UE capability information, wherein the modification instruction is configured to instruct the mobile terminal to monitor the paging message according to a first paging period, the first paging period is greater than a second paging period, the first paging period is a paging period according to which the mobile terminal monitors the paging message in a case that the mobile terminal accesses the wireless access device connected to the Internet, and the second paging period is a paging period according to which the mobile terminal monitors the paging message in a case that the mobile terminal does not access the wireless access device connected to the Internet.

10. The server according to claim 9, wherein the processor executes the computer program to:
   receive a paging message sent for the mobile terminal; and
   send the paging message to the mobile terminal through the wireless access device.

11. The server according to claim 9, wherein the identity information at least comprises: a medium access control (MAC) address of the mobile terminal, an IP address allocated to the mobile terminal by the wireless access device, an international mobile equipment identity (IMEI) code of the mobile terminal and a temporary mobile subscriber identity (TMSI) code of the mobile terminal.

12. A mobile terminal, comprising: a processor, a memory, and a computer program stored in the memory and executable on the processor, wherein the processor executes the computer program to perform the reporting method of the UE capability according to claim 4.

13. The mobile terminal according to claim 12, wherein the processor executes the computer program to:
   receive a modification instruction of paging period which is sent by the core network based on the UE capability information, wherein the modification instruction is configured to instruct the mobile terminal to monitor the paging message according to the first paging period; and
   modify the paging period to the first paging period according to the modification instruction.

14. The mobile terminal according to claim 12, wherein the processor executes the computer program to:
   modify the paging period to the first paging period according to a preset period value.

15. The mobile terminal according to claim 12, wherein the processor executes the computer program to:
   receive the paging message which is sent by the core network through the wireless access device.

16. The mobile terminal according to claim 12, wherein the identity information at least comprises: a medium access control (MAC) address of the mobile terminal, an IP address allocated to the mobile terminal by the wireless access device, an international mobile equipment identity (IMEI) code of the mobile terminal and a temporary mobile subscriber identity (TMSI) code of the mobile terminal.

* * * * *